United States Patent
Follestad et al.

(12) 
(10) Patent No.: US 6,610,799 B1
(45) Date of Patent: Aug. 26, 2003

(54) OLEFIN POLYMERIZATION PROCESS

(75) Inventors: Arild Follestad, Stathelle (NO); Vidar Almqvist, Porsgrunn (NO); Ketil Strand Andersen, Ulefoss (NO); Richard Blom, Oslo (NO); Ivar Martin Dahl, Oslo (NO); Arild Geir Andersen, Oslo (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/913,529

(22) PCT Filed: Feb. 22, 2000

(86) PCT No.: PCT/GB00/00623

§ 371 (c)(1),
(2), (4) Date: Oct. 24, 2001

(87) PCT Pub. No.: WO00/50466

PCT Pub. Date: Aug. 31, 2000

(30) Foreign Application Priority Data

Feb. 22, 1999 (GB) ............................................. 9904044
Feb. 22, 1999 (NO) ........................................... 19990834

(51) Int. Cl.$^7$ .............................. C08F 4/44; C08F 4/62; C08F 4/69; C08F 4/64
(52) U.S. Cl. ........................... 526/113; 526/59; 526/60; 526/114; 526/118; 526/119; 526/919; 526/160
(58) Field of Search ................................. 526/113, 114, 526/118, 119, 919, 59, 60, 106

(56) References Cited

U.S. PATENT DOCUMENTS 5,391,657 A    2/1995  Song et al.
6,410,474 B1 *  6/2002  Nowlin et al. .............. 502/113

FOREIGN PATENT DOCUMENTS

| EP | 0 570 000 A1 | 11/1993 |
| EP | 0 659 773 A1 | 6/1995 |
| WO | WO 92/17511 | 10/1992 |
| WO | WO 96/07478 | 3/1996 |
| WO | WO 96/09328 | 3/1996 |
| WO | WO 98/47928 | 10/1998 |
| WO | WO 99/61486 | 12/1999 |

* cited by examiner

Primary Examiner—D. R. Wilson
Assistant Examiner—R. Rabago
(74) Attorney, Agent, or Firm—Nixon & Vanderhye P.C.

(57) ABSTRACT

A process for olefin polymerization in a reaction vessel, said process comprising polymerizing at least one α-olefin in a polymerization stage employing a catalyst feed comprising 1) a first catalyst composition having at least two active catalytic sites capable of producing a first set of polymer components; 2) a second catalyst composition having at least two active catalytic sites capable of giving essentially the same set of polymer components as produced by the catalyst in feed (1) under the same polymerization conditions but these components in a different ratio to those produced by the catalyst composition of feed (1); wherein the amounts of catalyst compositions (1 and 2) fed into the reaction vessel are independently controlled.

18 Claims, 4 Drawing Sheets

PROCESS AND MODEL WITH ESTIMATOR
AND CONTROLLER

OLEFIN POLYMERIZATION PROCESS

This invention relates to a process for the preparation of olefin polymers in which a particulate multisite catalyst or catalyst mixture is used, in particular to a continuous polymerisation process employed to prepare particulate polymers and to the olefin polymers produced thereby.

The preparation of polymers can be achieved by the use of a variety of particulate multisite catalysts or catalyst mixtures as is well known in the art. The active catalysts may be, for example, mixtures between Ziegler-Natta, η-liganded and chromium oxide type catalysts. Typically, such polymer preparations may be performed by gas phase or slurry polymerisation. In such polymer preparation, each type of catalytic site makes a polymer component with varying characteristics depending on the reactor conditions as well as on the type of active site.

Such polymerisations are relatively sensitive and may therefore be easily disturbed or disrupted so that a consistent polymer product is not produced. Disturbances may detrimentally influence the ratio between the polymer components produced by the catalysts causing inconsistencies in the final polymer product. This problem is most noticeable in the preparation of bimodal and multimodal polymer products.

There thus remains a need for an olefin polymerisation process which produces a consistent polymer product and a process by which inconsistencies in the polymer product can be detected during the actual polymerisation and the ratio of polymer components adjusted accordingly to eliminate such inconsistencies.

Many of the manipulable polymerisation parameters such as comonomer concentration, monomer concentration, hydrogen concentration and reactor temperature are manipulated to alter other properties of the polymer product such as melt flow rate, crystallinity or molecular weight distribution or in order to achieve optimum production economics by high production rate and low catalyst consumption. Such parameters are therefore unsuitable for manipulation to ensure a consistent polymer product.

It is proposed in WO96/07478 to control the molecular weight of a bimodal resin by catalyst manipulation using a catalyst comprising a bimetallic catalyst and a make-up catalyst. The make-up catalyst consists of a single metallic component. A process is described in which is employed a bimetallic catalyst and a make-up catalyst in which these catalysts are fed into the reaction vessel by a system of two separate catalyst feeders.

However, the method described in WO96/07478 may produce a polymer powder which is very inhomogeneous. Such inhomogeneities may be detrimental to the further use of the polymer, causing problems in processes if forming finished articles directly from powder or when the powder is extruded before further use in which case the resulting granules themselves become partially inhomogeneous.

Moreover, the major portion of the polymer made by the process described in WO96/07478 is prepared from the dualsite catalyst. Only minor amounts of the make-up catalyst are employed. This causes significant process difficulties since in a standard polymer manufacturing plant the feeders are all of the same dimensions. Thus, in this case whilst one feeder will operate at approximately the normal catalyst feed rate, the other feeder will operate at a much lower feed rate than it was designed for. Having such a small amount of catalyst in a feeder leads to severe difficulties in controlling the feed rate since leakage past the control system becomes a significant hazard. It is therefore advantageous if all feeders contain a significant amount of catalyst.

We have now found that we can overcome the problem of inhomogeneity without any feeders operating at lower catalyst feed rates by feeding particulate multisite catalysts or catalyst mixtures with rather small compositional differences between them using several feeders.

Moreover, we have now found a method for maintaining consistent polymer component ratios and for producing a homogeneous polymer product comprising feeding a catalyst composition having at least two catalytic sites from at least two different catalyst feeders substantially simultaneously into the reaction vessel. If any deviation in the ratio of the produced polymer components is detected then the ratio of the feed rates of the catalyst composition may be adjusted accordingly to restore the ratios to their desired values.

BRIEF DESCRIPTION OF THE DRAWINGS

The invention is further illustrated in the appended drawings in which.

Figure 1:
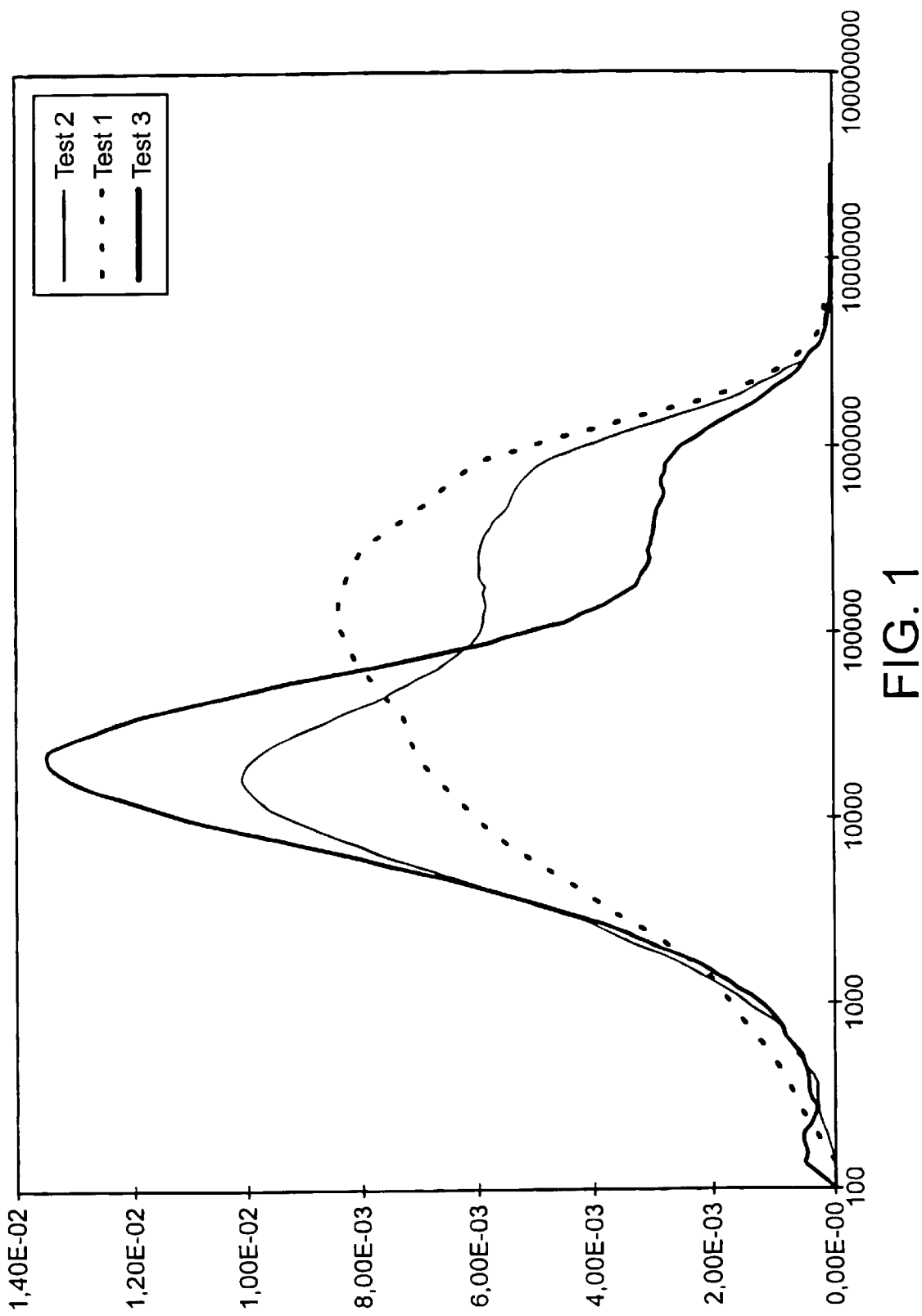
FIG. 1 is a graph of GPC curves showing polymerization using the catalysts prepared in Example 1.

Viewed from one aspect the invention therefore provides a process for olefin polymerisation in a reaction vessel, preferably for the production of an ethylene or propylene homo or copolymer, in particular for the preparation of ethylene copolymers, said process comprising polymerising at least one α-olefin in a polymerisation stage employing a catalyst feed comprising 1) a first catalyst composition having at least two active catalytic sites capable of producing a first set of polymer components;

2) a second catalyst composition having at least two active catalytic sites capable of giving essentially the same set of polymer components as produced by the catalyst in feed (1) under the same polymerisation conditions but these components in a different ratio to those produced by the catalyst composition of feed (1);

wherein the amounts of catalyst compositions (1) and (2) fed into the reaction vessel are independently controlled, preferably by feeding the catalyst compositions via separate catalyst feeders.

Each catalyst composition having at least two active catalytic sites may comprise a mixture of two or more single site catalysts but preferably comprises a particulate multisite catalyst where at least two active sites are present on the same carrier. Especially preferably the catalyst composition is a particulate dualsite catalyst.

However, in cases where the two catalytic sites may poison each other or in some way prevent each other from working efficiently, it may be necessary to employ a catalyst mixture in both feeders.

Thus, where the catalyst composition is formed from a mixture of one site catalysts there it is still possible to achieve excellent "balance control". There is the problem however that a catalyst mix tends to be sticky and is difficult to feed evenly into the reaction vessel. This makes it difficult to obtain good control over the ratio of catalysts fed. It has been found that flow may be dramatically improved by the addition of a flow agent such as Zinc oxide and this forms a further aspect of the invention. The flow agent allows the catalyst mixture to flow more readily and hence allows controlled feeding to the reaction vessel.

It is envisaged that electrical conducting or semi-conducting powders may be suitable as agents to improve the flow of catalyst mixes. Suitable flow improvers therefore include zinc oxide, iron powder, zinc powder, and aluminium powder. The average particle size of the components of the powder should preferably be less than 20 microns, especially less than 10 microns, most preferably around 3 microns. Without wishing to be limited by theory, it is believed that by employing small particle sizes, the flow agent may coat the surface of the catalysts more evenly.

The use of these flow agents is especially preferred where the catalyst mix system comprises a supported chromium oxide catalyst and a supported chromocene type catalyst.

When a flow agent is employed, it is preferred to use as little flow agent as required to ensure satisfactory flow. The amount is thus dependent on the nature of the flow agent but in general the amount may be from 1 wt % to 200 wt % compared to the weight of the catalysts with supports. Where the flow agent is zinc oxide, the amount may be from 1 wt % to 25 wt % especially around 3 wt %. Flow agents may be employed in gas phase or slurry phase polymerisations. In one embodiment flow agents may be employed where the catalyst mixes are being added to a reactor with a liquid as a slurry.

Where the catalyst composition is formed from multisite catalysts, the resulting polymer product is observed to have less powder fines and low gels in the extruded product. It has also been found that by employing two dualsite catalysts it is easier to measure MFR.

It is essential that the amount of each catalyst composition entering the reaction vessel is independently controlled. This enables the ratio of polymer components produced during polymerisation to be readily altered by the addition of further catalyst composition. It is of course not necessary for feed rates from a feeder to change it may be that one feeder is maintained at a constant feed rate whilst the feed rate in the other feeder is altered. The artisan would realise that both components could be fed into the reaction vessel via the same feeder although the amounts of each catalyst composition being fed into this single feeder would be independently controlled, however, it is preferred to employ two separate feeders. It is also preferred that the catalyst compositions be fed substantially simultaneously.

It is also preferred if the feed rate of the feeder giving the major catalyst composition is less than 4 times, preferably less than 2 times, the feed rate of the feeder giving the minor catalyst composition.

The term polymer component as used herein refers to a polymer made by one specific type of active site in the catalyst composition. The term polymerisation stage refers to a section or whole of a polymerisation process in which polymerisation parameters are chosen such that substantially the same polymer product is produced in that stage. The stage preferably takes place in a single reaction vessel.

Preferably the polymerisation process is a continuous process i.e. a process where the feeds and product outlet streams are continuous or if intermittent have a cycle time shorter than the average residence time in the polymerisation stage. The ratio of the catalyst feed streams is used to control the consistency of the polymer product. Thus, the individual polymer feeds must be independently controllable so that any detected aberration in the polymer product produced during the polymerisation process can be readily rectified by adjusting the polymer feeds appropriately. The tested polymer product may be the final polymer product produced by an entire synthesis of which the above polymerisation phase forms part or alternatively, the particular polymer produced during the above polymerisation stage may be analysed. The ratio of polymer components may also be estimated mathematically and catalyst feed rates adjusted accordingly. When the ratio of feeds is adjusted, it is preferred to adjust the feed rates so that a suitable total polymerisation rate is maintained.

Hence, viewed from another aspect the invention provides a method for the control of a continuous process for making a polymer, preferably an interparticle-homogeneous polymer, the process employing at least one catalyst composition, wherein said method comprises establishing the fraction of two or more polymer components present in a given stage of the polymerisation and adjusting the process to maintain those fractions at their preferred values. This ratio may be measured directly from samples taken from the reactor vessel, measured from analysis of polymer just downstream from the reactor vessel, from analysis of the final polymer product or be calculated mathematically from process parameters and a combination thereof. In a preferred embodiment this control is carried out by model-based predictive control.

By interparticle-homogeneous polymer it is meant that the resultant polymer does not comprise any particles of a single pure component.

Preferably the catalyst compositions are introduced into the reaction vessel substantially simultaneously. In another preferred embodiment the first catalyst feed stream passes through one or several polymerisation stages prior to the polymerisation stage described above and wherein the second catalyst feed is fed directly into the polymerisation stage described above.

The polymerisation product will typically have a bimodal or a multimodal, ie. broad, molecular weight distribution and may be suitable for use in blow moulding, film, pipe, wire, fibre or cable applications.

The process of the invention may optionally comprise further polymerisation stages before or after the above stage, e.g. to produce a heterophasic polymer; drying steps; blending of the polymer product with one or more further materials, e.g. further polymers, antioxidants, radiation (e.g. UV-light) stabilizers, antistatic agents, fillers, plasticizers, carbon black, colours, etc.; granulation, extrusion and pelletization; etc.

Viewed from further aspects the invention provides an olefin polymer, preferably a homogeneous olefin polymer produced by a process according to the invention or produced by a process in which the polymerisation stage of the invention forms a part, as well as the use of such polymers for the production of moulded articles, fibres, pipes, films, blow moulded, injection moulded and rotomoulded articles and products for wire and cable applications. Polymers produced by the process are preferably homogeneous and this forms a further aspect of the invention.

The process of the invention is one for the polymerization of α-olefins, in particular $C_{2-10}$ α-olefins, more particularly ethylene and propylene, especially ethylene. The polymer product made in each polymerization stage (if more than one is used) may be a homopolymer or a copolymer (which term is used to include polymers deriving from two or more monomer species). Where the product is a copolymer, preferably at least 50% by weight of the polymer derives from a $C_{2-10}$ α-olefin monomer, more particularly from a $C_{2-4}$ α-olefin monomer, preferably ethylene or propylene. The other monomer(s) may be any monomers capable of copolymerization with the olefin monomer, preferably mono or polyunsaturated $C_{2-20}$ compounds, in particular monoenes or dienes, especially $C_{2-10}$ α-olefins such as ethene, propene, but-l-ene, pent-l-ene, hex-l-ene, oct-l-ene or mixtures thereof. Bulky comonomers, e.g. styrene or norbornene may also be used. Generally, the polymer produced in the polymerization stages will comprise the same α-olefin monomer, e.g. as the sole monomer or as the comonomer from which at least 50%, preferably 60 to 99.8% of the copolymer derives. Thus the polymer product will preferably be an ethylene homopolymer, an ethylene copolymer, a propylene homopolymer or a propylene copolymer.

If several reactors are used, the catalysts used in the different polymerization stages may be the same or different; however the use of catalysts having the same type of catalyst sites is preferred. The catalytic sites employed may be any sites capable of catalysing olefin polymerisation and having acceptable catalytic activity. However, the two or more sites present in the catalyst composition should not show significant antagonistic behaviour towards each other, and any cocatalyst for the catalytic sites similarly should not show significant antagonistic behaviour. For example, Ziegler-Natta chloride-containing catalyst systems may poison chromium oxide catalysts.

Where the catalyst composition is formed from a particulate multisite catalyst, it is preferred that under the same polymerisation conditions, each catalytic site makes substantially the same polymer product when the site is present together with another site as it would singly as particulate pure catalyst. Furthermore, it should be possible by the use of these multisite catalysts to prepare a polymer composition with specifically tailored properties e.g. rheological/processing, mechanical, optical properties) as the end use in question requires.

In a preferred embodiment, the sites in the catalyst composition, preferably formed from multisite catalysts, are chosen regarding their ability to incorporate comonomer into the polymer product and their ability to tailor the molecular weight properties of the polymer product to fit the end use requirements. Both the incorporation of minor and major amounts of comonomer are of interest depending on the eventual use of the polymer product.

The catalyst composition of the invention may comprise a combination of Ziegler Natta type sites, metallocene type sites and chromium oxide type sites, e.g. metallocene and metallocene, metallocene and chromium oxide etc. Each feed stream should have a different ratio of catalytic sites to ensure differences between the polymer product obtained. The catalyst compositions should make essentially the same polymer components as the catalyst compositions in the other feeders but these components should be in a different ratio than those produced by the catalyst composition of another feeder.

There is no requirement that the catalyst employed in the first feeder has the same types of active sites as the catalyst employed in the second feeder. As long as the two catalysts produce substantially the same polymer components under similar polymerisation conditions, the actual chemical composition of the types of sites on the two catalysts may vary freely, however it is preferred if they are the same.

Although the invention is primarily described with respect to two catalytic feeds and two multisite catalysts, it is envisaged that this technique would work for three or more feeders and/or multisite catalysts or mixtures having three or more catalytic sites.

Suitable catalyst mixtures may be provided by the combination of two single site catalysts such as the catalytically effective metal:η-ligand complexes, chromium catalysts etc.

Suitable multisite catalysts may be provided by the combination on a single support of two single site catalysts such as the catalytically effective metal:η-ligand complexes, ie. complexes in which the metal is complexed by the extended Π-orbital system of an organic ligand. Such catalysts will be readily prepared by the person skilled in the art and their preparation is comprehensively described in WO98/57998 which is herein incorporated by reference. Metallocenes are an example of complexes in which a metal is complexed by two η-ligands—in the present invention metal:η-ligand complexes may be used where the metal is complexed by one, two or more η-ligands. The use of twin η-ligand metallocenes and single η-ligand "half metallocenes" (e.g. those developed by Dow) is particularly preferred. However the term metallocene as used herein is used to refer to all such catalytically active complexes containing one or more η-ligands. The metal in such complexes is preferably a group 4, 5, 6, 7 or 8 metal or a lanthanide or actinide, especially a group 4, 5 or 6 metal, particularly Zr, Hf or Ti. The η-ligand preferably comprises a cyclopentadienyl ring, optionally with a ring carbon replaced by a heteroatom (e.g. N, B, S or P), optionally substituted by pendant or fused ring substituents and optionally linked by bridge (e.g. a 1 to 4 atom bridge such as $(CH_2)_2$, $C(CH_3)_2$ or $Si(CH_3)_2$) to a further optionally substituted homo or heterocyclic cyclopentadienyl ring. The ring substituents may for example be halo atoms or alkyl groups optionally with carbons replaced by heteroatoms such as O, N and Si, especially Si and O and optionally substituted by mono or polycyclic groups such as phenyl or naphthyl groups. Examples of such homo or heterocyclic cyclopentadienyl ligands are well known from the scientific and patent literature, e.g. from the published patent applications of Hoechst, Montell, Borealis, Exxon, and Dow, for example EP-A-416815, WO96/04290, EP-A-485821, EP-A-485823, U.S. Pat. No. 5,276,208 and U.S. Pat. No. 5,145,819.

Thus the η-bonding ligand may for example be of formula I

where Cp is an unsubstituted, mono-substituted or polysubstituted homo or heterocyclic cyclopentadienyl, indenyl, tetrahydroindenyl, fluorenyl, benzindenyl, cyclopenta[l] phenanthrenyl, azulenyl, or octahydrofluorenyl ligand; m is zero or an integer having a value of 1, 2, 3, 4 or 5; and where present each Y which may be the same or different is a substituent attached to the cyclopentadienyl ring moiety of Cp and selected from halogen atoms, and alkyl, alkenyl, aryl, aralkyl, alkoxy, alkylthio, alkylamino, $(alkyl)_2P$, alkylsilyloxy, alkylgermyloxy, acyl and acyloxy groups or one Y comprises an atom or group providing an atom chain comprising 1 to 4 atoms selected from C, O, S, N, Si and P, especially C and Si (e.g. an ethylene group) to a second unsubstituted, mono-substituted or polysubstituted homo or heterocyclic cyclopentadienyl, indenyl, tetrahydroindenyl, fluorenyl or octahydrofluorenyl ligand group.

In the η-bonding ligands of formula I, the rings fused to the homo or hetero cyclopentadienyl rings may themselves be optionally substituted e.g. by halogen atoms or groups containing 1 to 10 carbon atoms.

Many examples of such η-bonding ligands and their synthesis are known from the literature, see for example: M öhring et al. J. Organomet. Chem 479:1–29 (1994), Brintzinger et al. Angew. Chem. Int. Ed. Engl. 34:1143–1170 (1995).

Examples of suitable q-bonding ligands include the following:

cyclopentadienyl, indenyl, fluorenyl, pentamethyl-cyclopentadienyl, methyl-cyclopentadienyl, 1,3-dimethyl-cyclopentadienyl, i-propyl-cyclopentadienyl, 1,3-di-i-propyl-cyclopentadienyl, n-butyl-cyclopentadienyl, 1,3-di-n-butyl-cyclopentadienyl, t-butyl-cyclopentadienyl, 1,3-di-t-butyl-cyclopentadienyl, trimethylsilyl-cyclopentadienyl, 1,3-di-trimethylsilyl-cyclopentadienyl, benzyl-cyclopentadienyl, 1,3-di-benzyl-cyclopentadienyl, phenyl-cyclopentadienyl, 1,3-di-phenyl-cyclopentadienyl, naphthyl-cyclopentadienyl, 1,3-di-naphthyl-cyclopentadienyl, 1-methyl-indenyl, 1,3,4-tri-methyl-cyclopentadienyl, 1-i-propyl-indenyl, 1,3,4-tri-i-propyl-cyclopentadienyl, 1-n-butyl-indenyl, 1,3,4-tri-n-butyl-cyclopentadienyl, 1-t-butyl-indenyl, 1,3,4-tri-t-butyl-cyclopentadienyl, 1-trimethylsilyl-indenyl, 1,3,4-tri-trimethylsilyl-cyclopentadienyl, 1-benzyl-indenyl, 1,3,4-tri-benzyl-cyclopentadienyl, 1-phenyl-indenyl, 1,3,4-tri-phenyl-cyclopentadienyl, 1-naphthyl-indeny, 1,3,4-tri-naphthyl-cyclopentadienyl, 1,4-di-methyl-indenyl, 1,4-di-i-propyl-indenyl, 1,4-di-n-butyl-indenyl, 1,4-di-t-butyl-indenyl, 1,4-di-trimethylsilyl-indenyl, 1,4-di-benzyl-indenyl, 1,4-di-phenyl-indenyl, 1,4-di-naphthyl-indenyl, methyl-fluorenyl, i-propyl-fluorenyl, n-butyl-fluorenyl, t-butyl-fluorenyl, trimethylsilyl-fluorenyl, benzyl-fluorenyl, phenyl-fluorenyl, naphthyl-fluorenyl, 5,8-di-methyl-fluorenyl, 5,8-di-i-propyl-fluorenyl, 5,8-di-n-butyl-fluorenyl, 5,8-di-t-butyl-fluorenyl, 5,8-di-trimethylsilyl-fluorenyl, 5,8-di-benzyl-fluorenyl, 5,8-di-phenyl-fluorenyl and 5,8-di-naphthyl-fluorenyl.

Besides the η-ligand, the catalyst complex used according to the invention may include other ligands; typically these may be halide, hydride, alkyl, aryl, alkoxy, aryloxy, amide, carbamide or other two electron donor groups.

Thus, in a preferred embodiment the multisite catalyst composition comprises two η-ligand catalysts, most preferably a combination of an unbridged (alkyl substituted) metallocene with a substituted silican bridged bis(indenyl) zirconium dichloride catalyst, the latter preferably being substituted on the 1 and 4 positions.

Where a Ziegler Natta catalyst is employed as one active site on a multisite catalyst, this may be any convenient Ziegler Natta catalyst, e.g. a group 4 metal chloride (e.g. titanium chloride) associated with $MgCl_2$, MgO or $SiO_2$ or a mixture thereof (see also PCT/SE96/01652). For example, Ti and/or optionally Hf are employed in Ziegler-Natta catalysts as the active site. The support material is often a dry $MgCl_2$ or silica. When silica is employed, $MgCl_2$ is usually present along with Ti in the pores of the microporous silica. Such a particulate catalyst material needs a cocatalyst, often a an aluminium alkyl or alkyl chloride such as $Al(CH_2CH_3)_3$, $Al(CH_3)_3$ $AL(^iBu)_3$ or $Al(CH_2CH_3)_2Cl$.

In a preferred embodiment according to the invention, a metallocene is used as one site and chromium oxide is used as the second site in a multisite catalyst.

Where a chromium oxide catalyst is employed, these for example may be prepared by impregnating a chromium compound that will give chromium oxide when calcined such as $Cr(acetate)_3$ or $CrO_3$. The Cr compound is impregnated into particles of an inorganic particulate support material, e.g. silica, alumina, aluminium phosphate, optionally with titania. Alternatively, the Cr compound is co-precipitated from an aqueous solution together with inorganic material, especially hydroxides and oxides of Si, Al and Ti. The support with the Cr is then activated in an oxidising atmosphere e.g. dry air at a temperature of 500–950° C. Then, optionally, subsequent to the oxidising atmosphere stage, an atmosphere with carbon monoxide is passed through the particulate catalyst in an amount sufficient to reduce the major part of Cr to divalent form at a temperature of 250–400° C.

It is further preferred that the particulate multisite catalysts employed be of a kind that makes a homogeneous polymer powder.

The multisite catalysts employed in the invention are often prepared at a large catalyst production plant. Before using a catalyst mix or multisite catalyst prepared in the plant it is of course essential to determine whether the catalyst batch is inside the desired specification. According to a further aspect of the invention this may be achieved by testing a small amount of the catalyst batch in a bench scale polymerisation to determine the nature of the polymer produced. If the produced polymer is not as expected and hence, the catalyst batch is outside desired specification then instead of throwing away expensive catalyst, the next catalyst production run may be deliberately run to give a catalyst batch that when combined with the earlier off batch, returns the catalyst composition to its desired formulation. Determining whether a catalyst batch is off specification may be determined by comparing the GPC curve of a polymer produced by the off specificatoin catalyst with the GPC curve of the desired polymer.

The catalyst systems used may of course involve co-catalysts or catalyst activators and in this regard any appropriate co-catalyst or activator may be used. Thus for η-ligand complexes, aluminoxane or boron compound cocatalysts may be used and are preferably incorporated into the particulate catalyst. It is envisaged however that the use of extra added cocatalyst may not be required.

Preferred aluminoxanes include $C_{1-10}$ alkyl aluminoxanes, in particular methyl aluminoxane (MAO) and aluminoxanes in which the alkyl groups comprise isobutyl groups optionally together with methyl groups. Such aluminoxanes may be used as the sole co-catalyst or alternatively may be used together with other co-catalysts. Thus besides or in addition to aluminoxanes other cation complex forming catalyst activators may be used. In this regard mention may be made of the silver and boron compounds known in the art. What is required of such activators is that they should react with the η-liganded complex to yield an organometallic cation and a non-coordinating anion (see for example the discussion on non-coordinating anions J$^-$ in EP-A-617052 (Asahi)).

Aluminoxane co-catalysts are described by Hoechst in WO 94/28034. These are considered multicyclic cyclic oligomers having up to 40, preferably 3 to 20, [Al(R")O]-repeat units (where R" is hydrogen, $C_{1-10}$ alkyl (preferably methyl and/or isobutyl) or $C_{6-18}$ aryl or mixtures thereof).

It is particularly desirable that the η-ligand complex be supported on a solid substrate for use in such polymerization reactions. Such substrates are preferably porous particulates, e.g. inorganic oxides such as silica, alumina, silica-alumina or zirconia, inorganic halides such as magnesium chloride, or porous polymer particles, e.g. acrylate polymer particles or styrene-divinylbenzene polymer particles. Weight average median particle sizes are preferably in the range 10 to 60 μm and porosities are preferably in the range 1 to 3 mL/g. The complex may be loaded onto the support before, or more preferably after it has been reacted with a co-catalyst. Desirably, inorganic supports are heat treated (calcined) before being loaded with the complex.

The cocatalysts that may be used may either be incorporated into the particulate catalyst (as is conventional in metallocene catalyst chemistry) or added separately as liquid adjuvants (as would be usual when employing Ziegler-Natta catalysts) or both.

The catalyst system used may have more than two active catalytic sites. Preferably these are uniformly distributed over the support (carrier) particles, especially with each type of site being uniformly distributed on the same particles. Preferably one of the types of active sites is more hydrogen consuming than the other, e.g. the support particles could be loaded with a metallocene and a chromium catalyst or a metallocene and a Ziegler catalyst or two metallocene catalysts of different hydrogen consuming ability.

The process stage described by the invention may be the only polymerisation stage in the synthesis and may be carried out in a single reactor. Alternatively, the entire polymerisation process of which this polymerisation stage forms a part may be effected in a number of stages and in a series of two or more reactors.

Each polymerization stage may be effected using conventional procedures, e.g. as a slurry, gas phase, solution or high pressure polymerization. Slurry polymerisation includes polymerisation at slightly supercritical conditions. Mixed gas phase and slurry reactors are preferred. For the process stage of the invention, slurry phase polymerisation is preferred. Slurry polymerization (e.g. bulk polymerization) is preferably effected, e.g. in a tank reactor or more preferably a loop reactor. The entire polymerization process may use a series of two or more reactors, preferably loop and/or gas phase reactors, e.g. a combination of loop and loop, gas phase and gas phase or most preferably loop and gas phase reactors especially as described in EP-B-517868 and WO 96/18662. In slurry reactors, if a major monomer is propylene this may also function as a solvent/diluent as well as a reagent. If the major monomer is ethylene, a non-polymerizable organic compound, e.g. a $C_{3-10}$ alkane, for example propane or isobutane, may be used as a diluent. Where this is done, the volatile non-reacted or non-reactive materials will desirably be recovered and reused. Polymerisation techniques are of course well known and would be readily effected by the artisan.

Most preferably the entire process is effected by feeding two multisite catalysts via separate feeders, optionally via a prepolymerisation reactor, the contents of which are then transferred to the reaction vessel in which the polymerisation stage described by the invention takes place, said reaction vessel preferably being a slurry loop reactor, said stage optionally being followed by further reaction stages such as a gas phase fluidised reactor stage, optionally employing a further gas phase reactor after the first gas phase. It is preferred however that no further polymerisation stages follow the stage described above.

Figure 4:
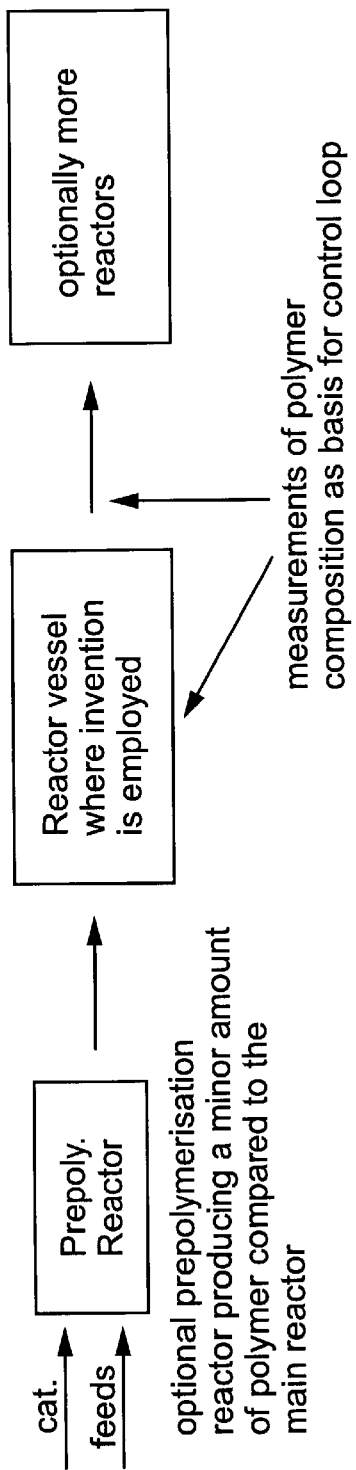
FIG. 4 is a flow diagram of canyino out the polymerization according to one embodiment of the invention.
Figure 5:
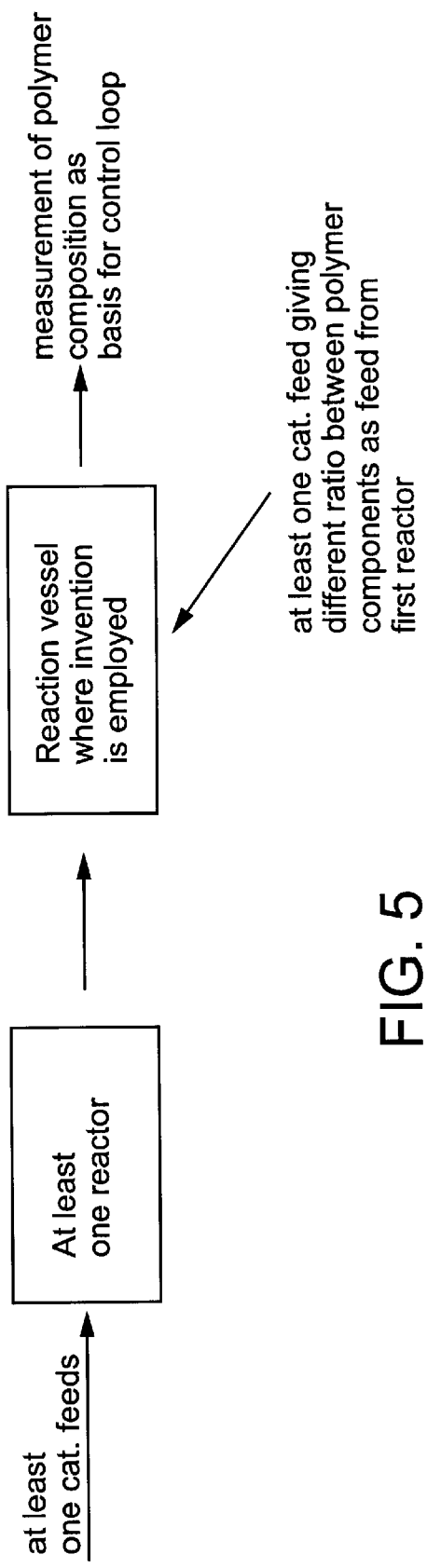
FIG. 5 is a flow diagram of canying out the polymerization according to another embodiment of the invention.

Alternatively, the polymerization may be carried out as shown in the flow diagram of FIG. 4. Here both multisite catalysts may be added to a reaction vessel before being transferred to the reaction vessel in which the polymerization stage of the invention is carried out. Further multisite catalysts may then be added to this reactor. In another embodiment, shown in the flow diagram of FIG. 5 one or more multisite catalysts may be fed to at least one initial reactor which is then transferred into the reaction vessel in which the polymerization stage of the invention is carried out. Here another required multisite catalyst can be fed directly into the main reaction vessel, giving the opportunity to control the ratio of the polymer components made in this reactor.

The reactor used in the polymerization process of the invention is preferably continuous. This should be understood also to include the case when feeds to and flows from the reactor may be intermittent if the time constant of the intermittent flows are shorter than the average residence time in the reactor.

Typical reaction conditions for loop and gas phase reactors are: loop—temperature 60–110° C., pressure 30–70 bar, mean residence time 30–80 minutes; and gas phase—temperature 60–110° C. (preferably 80–105° C.), pressure 10–25 bar, mean residence time 20–300 minutes. Where hydrogen is used to control molecular weight/$MFR_2$, the hydrogen partial pressure will typically be 0.0001 to 0.5 bar.

The catalyst composition streams may be fed directly to the reactor stage in question, or may—wholly or in part—be added to one preceding stage like a reactor, especially a prepolymerisation reactor or a particulate catalyst pretreatment step, like a precontact step between catalyst and cocatalyst. In a preferred embodiment one of the catalyst compositions is added upstream of the main reaction vessel such that the time lag from its addition point to the reactor is greater than the residence time of the reactor. The final form of the catalyst composition may be generated in situ in the polymerisation process. Also, the catalysts may be added semi-continuously, i.e. at intervals shorter than the residence time of the reactor in question.

The final polymer product of the process of the invention will preferably have a $MFR_{21}$ of about 1 to an $MFR_2$ of about 100, a weight average molecular weight (Mw) of 30000 to 500000, a melting point of 100–165° C. (e.g. 100–136° C. for polyethylenes and 120 to 165° C. for polypropylenes) and a crystallinity of 20 to 70%. The polymer made of a single stage of a multistage process is preferably from $MFR_{21}$ about 0.01 to $MFR_2$ about 5000. (i.e. if only this reaction stage were performed using the same reaction conditions then these would be the MFR values).

This polymer can be formulated together with conventional additives, e.g. antioxidants, UV-stabilizers, antistatic agents, colours, fillers, plasticizers, etc. and can be used for fibre or film extrusion or for raffia, or for pipes, or for cable or wire applications or for moulding, e.g. injection moulding, blow moulding, rotational moulding, etc., using conventional moulding and extrusion equipment.

In general it is more difficult to ensure consistent polymer characteristics in polymers prepared employing particulate dualsite or other particulate multisite catalysts than with polymers made in a more traditional way employing particulate one site catalysts.

A polymer made by one stage polymerisation with a particulate dualsite catalyst, may in principle be analysed to determine for example the following main characteristics:

molecular weight (MW) and comonomer content of the first polymer component molecular weight and comonomer content of the second polymer component the fraction of each of the two polymer components.

If there are more polymerisation stages, more than two active sites on the catalyst, more than two monomers, tacticity differences between the polymers made by each site or long chain branching, then there will be other main characteristics of the polymer which may be analysed. The amount of polymer made by each site, the "balance" between the polymer components, is critical. It may easily be influenced by random inconsistencies in the supplied particulate catalyst.

The "balance" may furthermore be disturbed by process parameters that are used for control of other properties such as production rate, crystallinity and molecular weight of the polymer components and residence time in the polymerisation stage. It is clear that there may be a need for additional variables by which to control the polymer composition when employing multisite catalysts.

If one employs two separately controlled catalyst feeders, each coming from separate catalyst feeding vessels, the ability to control and manipulate the polymer composition is achieved.

For example, where it is desired to prepare a polymer comprising two polymer components that can be made with active sites I and II in one polymerisation stage, then:

catalyst feeder (1) feeds a particulate dual site catalyst of sites I and II, catalyst feeder (2) feeds a particulate dual site catalyst of sites I and II, but with a somewhat different ratio of sites I and II. This different ratio of sites results in this multisite catalyst producing a different ratio of polymer components than the multisite catalyst fed through feeder (1). So by changing the ratio between catalyst fed through feeder (1) and catalyst fed through feeder (2) the ratio of the polymer components may be varied.

This method has the following advantages:

easy to homogenise the polymer powder product during extrusion to achieve low gel rating, deviations of the particulate multisite catalyst or disturbances during production can be compensated continuously so that a consistent polymer product can be produced, even an extreme instability in the flow of any of the catalyst feeds may not very seriously upset the ratio of the polymer components, the polymer powder made is essentially homogeneous.

Whenever an imbalance in the polymer product is detected, the feeds of e.g. multisite catalysts can be adjusted accordingly to ensure a consistent polymer product. Analysis of the polymer product can be carried out by a variety of techniques well known in the art.

Measurements of the ratios between the different polymer components can be made in a number of ways. For process control purposes, measurements need to be taken fast, but need not necessarily be absolutely accurate. Spectroscopic methods like near infrared spectroscopy (NIR) and infrared spectroscopy (IR) may be used for analysing the polymer product.

By IR for example single methyl groups attached to a polyethylene backbone can be detected, which for example is characteristic of polymer components produced by chromocene catalysts. Nuclear magnetic resonance (NMR) may also be used to detect methyl groups in the polymer backbone. Further, the relative amounts of unsaturation in the polymer, which may be observed by IR, is characteristic of different types of active sites.

For polypropylene, IR and NMR provide information about the tacticity of the polymer, which is of special interest in the case where the different kinds of sites do not make the same degree of, or type of, tactility. NMR is also able to give information about the tacticity distribution.

A polymer that contains much of a second monomer (comonomer), can be analysed by NMR to determine its distribution of incorporated comonomer from which it is possible to calculate the amount of each fraction of polymer component. It is a preferred feature of the invention that comonomer incorporation and molecular weight distribution are closely controlled using the process of the invention.

Differential scanning calorimetry (DSC) or differential thermal calorimetry (DTA) can be used to give information about the average comonomer level incorporated as well as yielding information about the comonomer distribution in the polymer.

Measurements of melt flow provide information about average molecular weight (MW) of the polymer. Furthermore, melt flow ratios (for instance ratio between melt flow value measured with 21.6 kg weight vs 2.16 kg weight) can be used to gain information about relative molecular weight distribution (MWD) of the polymer.

Rheological methods, including on-line rheological measurements in a process can also be used to gain information about broadness of the molecular weight distribution (MWD) of the polymer, for instance the melt viscosity (MW parameter) and the change of viscosity with shear rate (MWD parameter).

Solution viscosity of the polymer (intrinsic viscosity) may also be used to analyse the MW parameter of the polymer. Also process parameters such as concentrations, temperature and material balance of the polymerisation stage in question may be used to gain information about the polymer produced, possibly by means of a polymerisation simulation model. For instance the molecular weights of one or more polymer components may be evaluated from the process parameters.

Hydrogen concentration is an important factor in determining the molecular weight of the polymer made by Ziegler and metallocene based catalysts. If there is high hydrogen conversion in the polymerisation stage, making an estimate of the actual concentration of hydrogen in the polymerisation stage becomes relatively difficult and it may be preferred to use the hydrogen consumption in the polymerisation stage instead as basis for a MW parameter estimate. The ratio of chemical consumption of hydrogen over the polymerisation rate for a specific type of active site usually provides a good measure of the reduced length of polymer chains. In the case of more than one kind of active site competing for the hydrogen, some additional measurement(s) like for instance melt flow measurements, are, however, needed in order to calculate the MW parameter of each polymer component.

Several of these measurable parameters mentioned may together be used to gain a more reliable and complete insight into the composition of the polymer produced or at least achieve information about the deviation of the polymer product from the polymer goal and what to do to decrease such deviation. This may be done by so-called hard modelling (mechanistic model).

For example it is possible using the molecular weight of one or more polymer components obtained from the process parameters together with a measurement on the polymer of an average molecular weight parameter, optionally employing also one MWD-related parameter measured on the polymer to calculate the actual weight ratios of the polymer components produced. If these ratios deviate from the desired polymer product ratio, then, appropriate measures may be taken for example to adjust both the MW's of the individual polymer components as well as the weight ratios of the polymer components, by adjustment of the reactor stage process parameters such as the feed rates of the particulate catalysts.

Another example is that only two kinds of active sites and two monomers are present in a single stage reactor. The concentrations of those monomers in the reactor stage are measured, and the average ratio of the two monomers polymerised in that stage is measured on the polymer or is calculated by a material balance over the polymerisation stage. If furthermore the relative kinetics of polymerisation of the monomers (ratio of the propagation rate constant of the first vs second monomer) are known on both of the types of active sites then the ratio of polymer (=polymer components) produced by each site may be calculated.

Alternatively, instead of a hard model, a softer model may be used, for example a chemometric model to obtain information on which way to adjust the process back to the polymer composition goal.

Now the preferred range relating to the catalyst composition in the separate feed streams will be described.

Consider a catalyst feed system, comprising two or more separate catalyst feed streams with different compositions. Indexes i and j points at two different of these feed streams. Indexes k and l points at two different kinds of catalytic sites.

Let further:

$$\alpha_{ijkl} = \frac{\frac{F_{ik}}{F_{il}}}{\frac{F_{jk}}{F_{jl}}}$$

where $F_{ik}$ is the polymer production rate from the catalytic site k coming with separate catalyst feed stream i, $F_{il}$ is the polymer production rate from the catalytic site l coming with separate feed stream i, etc.

It is preferred that at least one set of i, j, k and l exists where the following conditions are satisfied:

$1/\eta < \alpha_{ijkl} < \eta$ $|\alpha_{ijkl} - 1| > 0.01$ and where $\eta = 2$ It is more preferred that the conditions are satisfied for $\eta = 1.5$, and most preferred for $\eta = 1.25$.

For a system of three or more catalytic sites and three or more separate catalyst feed streams, it is preferred that among all the $\alpha_{ijkl}$'s satisfying the conditions, the k and l's represent together at least three kinds of catalytic sites.

All publications referred to herein are hereby incorporated by reference.

The invention will now be illustrated further by reference to the following non-limiting Examples.

EXAMPLE 1

Catalyst and Polymerization

T-10099: Catalyst synthesis was performed in a glove box with dry nitrogen. 5.6 mg (nBuCp)$_2$ZrCl$_2$ (complex A), 25 mg racemic SiMe$_2$(2-Me,4-Ph Ind)$_2$ZrCl$_2$ (complex B), 2.4 ml of a 30 w % methylaluminoxane (MAO) in toluene and 0.6 ml toluene were mixed for 30 minutes under inert conditions. A porous silica powder, 55SJ from Grace had been previously calcined in flow of dry air at 600° C. 1 g of this calcined silica was added in a vessel equipped with a magnetic stirrer. 1.4 ml of the metallocene-containing solution was added dropwise to the stirred silica powder. Afterwards the impregnated catalyst was heated to 50° C. for 30 minutes, and then dried in nitrogen flow at 50° C. for 30 minutes. The finished catalyst contained 0.006 mmol of complex A per g of carrier, 0.020 mmol of complex B per g carrier and 5.5 mmol Al from MAO per g carrier.

Catalysts T-10096 and T-10100 were prepared in the same way, except the amounts of complex A and complex B were different.

Polymerization was performed in a 2 liter semibatch reactor equipped with temperature control system and stirring. Catalyst and 1 liter of isobutane were charged to the reactor. The isobutane contained 0.18 w % of 1-hexene. Ethylene, containing 2350 molppm of hydrogen, was added through a pressure control valve to maintain the pressure at 29 bar. The temperature was 85° C.

The results are indicated in the table below.

| Cat batch | batch 1 | batch 2 | batch 3 |
|---|---|---|---|
| Complex A mmol/g | 0.006 | 0.013 | 0.019 |
| Complex B mmol/g | 0.020 | 0.013 | 0.007 |
| Molar fraction complex A | 0.22 | 0.50 | 0.75 |
| Total loading of Zr, mmol/g | 0.026 | 0.026 | 0.026 |
| MAO (as Al)/Zr, mol/mol | 210 | 210 | 210 |
| Pol test no | test 1 | test 2 | test 3 |
| Cat weight, g | 0.083 | 0.089 | 0.080 |
| Polymer weight, g | 110 | 170 | 193 |
| MFR2 | 0.017 | 0.05 | 2.1 |
| MFR5 | 0.19 | 0.36 | 9.4 |
| MFR21 | 5 | 13.5 | 182 |
| FRR21/2 | 294 | 270 | 87 |
| Density g/cm3 | 0.948 | not anal. | 0.960 |
| Mn | 9000 | 11000 | 9000 |
| Mw | 235000 | 190000 | 125000 |
| Mw/Mn | 26 | 17 | 14 |
| Approximate fraction of LMW polymer estimated from GPC curves | 0.42 | 0.65 | 0.84 |

Discussion

It is seen from the GPC curves (FIG. 1) that the amount of the HMW polymer (polymer B) decreases when the amount of complex B decreases. Let us assume we wish to produce a polymer with fraction of LMW polymer of 0.50 in a continuous process. Then it is advantageous to produce this by a catalyst like batch 1 from one feeder, catalyst like batch 2 from another feeder. Then the polymer composition can be controlled by adjusting the ratio catalyst feeds. Similarly a fraction of LMW polymer of 0.75 can be made by feeding catalyst like batch 2 from one feeder, and catalyst like batch 3 from another feeder.

Thus for example, FRR21/2 is a function of the polymer composition and this parameter is observed to fall as the amount of complex A is increased at least in part of the range. Hence, by increasing the amount of complex A in the reactor vessel, the FRR21/2 value can be reduced and thus the polymer composition controlled.

So if the artisan aims for a LMW fraction of 0.75 in the polymer product by employing feeds of batch 2 and batch 3 and the FRR21/2 is found to be low, then the feed of batch 2 should be increased.

EXAMPLE 2

Catalyst a:

A porous powder of an intimate mixture of silica and zirconia was used as carrier. It had a pore volume of 1.4 g/cm3, a specific surface area of 280 m3/g, a content of Zr of 4 w%, the weight median average size was 160 micron., and 10 w% of the powder was less than 105 micron. The carrier was calcined in a flow of dry air in a fluidized bed at 600° C. and cooled in a flow nitrogen.

The following components were mixed and stirred for 10 minutes in a glove box under dry nitrogen:

40,5 mg (nBuCp)$_2$ZrCl$_2$(complex A)

3,75 ml of a 30 w% methylaluminoxane (MAO) in toluene 3 g of the calcined carrier was added in a vessel equipped with a magnetic stirrer. 8.25 ml toluene was then added dropwise into this vessel, then the solution above was added. The mixture was stirred for 20 minutes, then left without stirring for 20 hours. Then it was dried by a flow of nitrogen without stirring until free-flowing, then for additional 3,5 hours at 40° C. with stirring.

Catalysts b, c, d were prepared in the same way, except for an additional complex, being racemic $Si(Me_2("-Me, 4-Ph, Ind)_2ZfCl_2$ (complex B), and different amounts of raw materials used, as seen from the table.

From the runs, one can learn:

It is possible to obtain approximately the same MWD (and density) by mixing dual site catalysts as by one dual site catalyst of an intermediate chemical composition—at the same polymerization conditions. (run 11649 has an intermediate compositional balance vs its dual site catalyst components' runs 11641 and 11643. This is also the case of 11650 vs 11641 and 11642.) So the two catalyst feeds can be used for adjusting compositional balance.

Cat preparation table

| | Cat batch | | | | | | |
|---|---|---|---|---|---|---|---|
| | a | b | c | d | e | f | g |
| Weight of carrier, g | 3 | 3 | 3 | 3 | 1 | 1 | 1 |
| Complex A, mmol/g | 0.033 | 0.025 | 0.017 | 0.0083 | 0.000 | 0.0083 | 0.0083 |
| Complex B, mmol/g | 0.000 | 0.084 | 0.017 | 0.025 | 0.033 | 0.025 | 0.025 |
| Volume of solution ml/g | 4.0 | 4.0 | 4.0 | 4.0 | 4.0 | 4.0 | 4.0 |
| Molar fraction complex A | 1.00 | 0.75 | 0.50 | 0.25 | 1.00 | 0.25 | 0.25 |
| Total loading of Zr, mmol/g | 0.033 | 0.033 | 0.033 | 0.033 | 0.033 | 0.033 | 0.033 |
| MAO as (as Al)/Zr, mol/mol | 5.7 | 5.7 | 5.7 | 5.7 | 5.7 | 5.7 | 5.7 |
| MAO (as Al/Zr, mol/mol | 170 | 170 | 170 | 170 | 170 | 170 | 170 |

Polymerisation was performed as in example 1, except: The ethylene contained 1270 molppm of hydrogen, and the pressure was maintained at 32 bar gage and the polymerisation times were as shown in the table. The polymerization temperature was 95 C.

The polymers were extruded on an Axon extruder before measuring MFR's and density.

By mixing a small amount of the pure catalyst "a" with another catalyst, a polymer powder with a high amount of fines is obtained (run 11651). On the other hand, polymerising simultaneously with a mixture of two dual site catalysts (runs 11649 and 11650) and at the identical polymerization conditions to obtain a polymer with approximately the same MWD, gives a polymer

| | Pol test no | | | | | | | | | |
|---|---|---|---|---|---|---|---|---|---|---|
| | 11639 | 11642 | 11643 | 11641 | 11646 | 11645 | 11644 | 11649 | 11650 | 11651 |
| Catalyst batch: w % | a: 100 | b: 100 | c: 100 | d: 100 | e: 100 | f: 100 | g: 100 | c: 80 d: 20 | b: 50 d: 50 | a: 40 b: 60 |
| Total cat weight, g | 0.270 | 0.145 | 0.182 | 0.287 | 0.216 | 0.212 | 0.200 | 0.176 | 0.173 | 0.264 |
| Time, min | 60 | 70 | 70 | 70 | 70 | 70 | 70 | 70 | 70 | 70 |
| Polymer weight, g | 422 | 300 | 285 | 366 | 210 | 210 | 275 | 254 | 300 | 420 |
| PSD: | | | | | | | | | | |
| >900μ, wt % | 26 | 65.8 | 73.2 | 57.4 | — | 64 | 69.6 | 70 | 71.6 | 52.4 |
| 900–150μ, wt % | 72.8 | 34.0 | 26.2 | 42.0 | — | 36.2 | 30.6 | 29.6 | 27.8 | 46.8 |
| 150–75μ, wt % | 1.4 | 0.0 | 0.2 | 0.2 | — | 0.0 | 0.0 | 0.2 | 0.2 | 1.0 |
| <75μ, wt % | 0.2 | 0.0 | 0.0 | 0.0 | — | 0.0 | 0.0 | 0.0 | 0.0 | 0.1 |
| MFR2 | 20 | 5.7 | 0.44 | 0.03 | 0.06 | 0.04 | 0.08 | 0.15 | 0.85 | 0.63 |
| MFR21 | 720 | 160 | 32 | 2.3 | 3.6 | 3.3 | 5.9 | 11.0 | 40 | 32 |
| Density g/dm3 | 956.1 | 957.8 | 952.8 | 949.8 | 942.7 | 948.3 | 950.8 | 952.9 | 954.2 | 954.1 |
| Mn | 16000 | 14000 | 15000 | 17000 | 25000 | 19000 | 14000 | 23000 | 18000 | 20000 |
| Mw | 50000 | 90000 | 165000 | 300000 | 245000 | 265000 | 295000 | 230000 | 153000 | 180000 |
| Mw/Mn | 3 | 6.6 | 11 | 17 | 9.5 | 14 | 21 | 10 | 8.7 | 9 |
| Fraction of LMW polymer estimated from GPC curves, w % | 100 | 85 | 75 | 50 | 0 | 60 | 65 | 65 | 70 | 70 | powder with a low amount of fines. So in a catalytic system of two types of active sites, making the polymer with simultaneous polymerization with two dual site catalysts is much more preferable than making the polymer with simultaneous polymerization of a dual site catalyst and a one-site catalyst.

By comparison of runs 11641, 11644, 11645, it is seen that the catalyst preparation (or the polymerisation) is not reproducible, even if in this case were used the same raw materials and equipment. See especially the plotted GPC curves to see that the balance between sites is not reproducible. This means that in production, there will be a need for a control system to keep the product constant.

EXAMPLE 3

Figure 2:
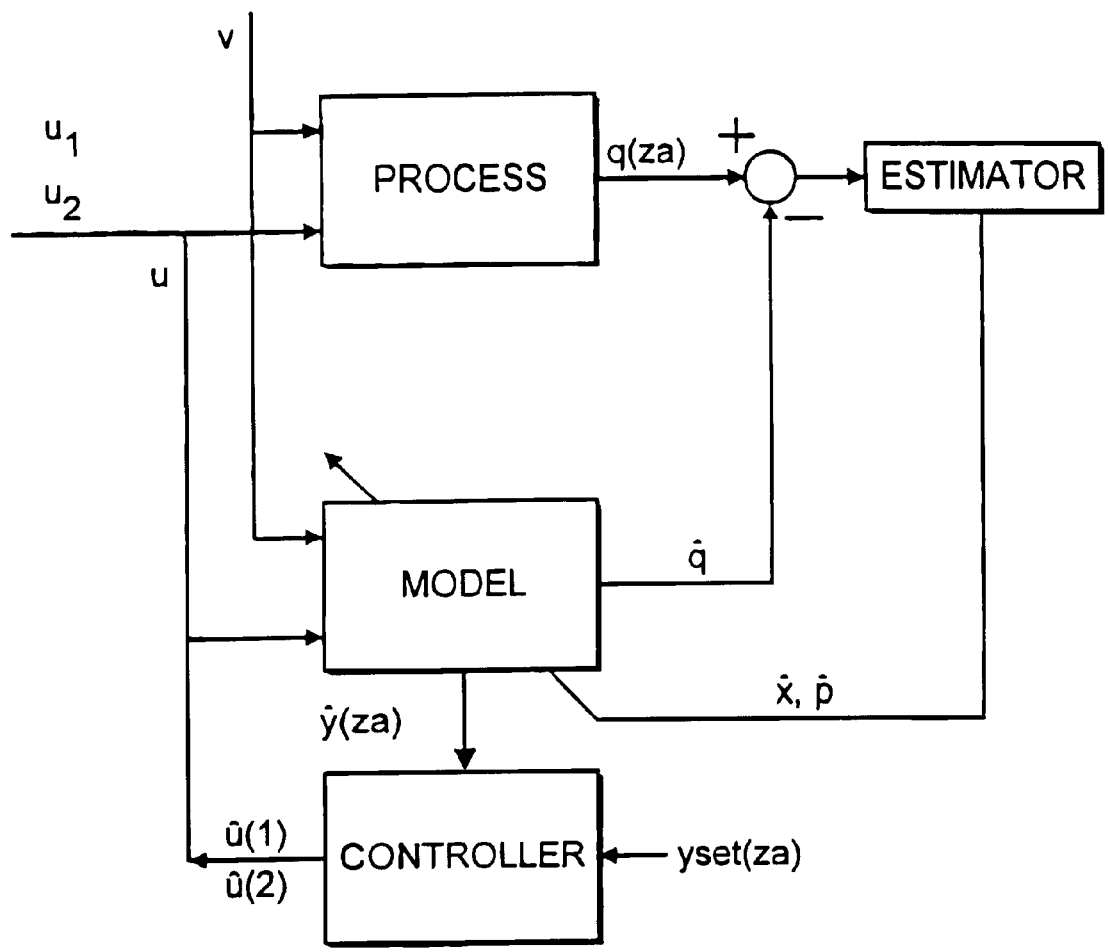
FIG. 2 is a flow chart illustrating the process and model with estimator and controller as explained in Example 3.
Figure 3:
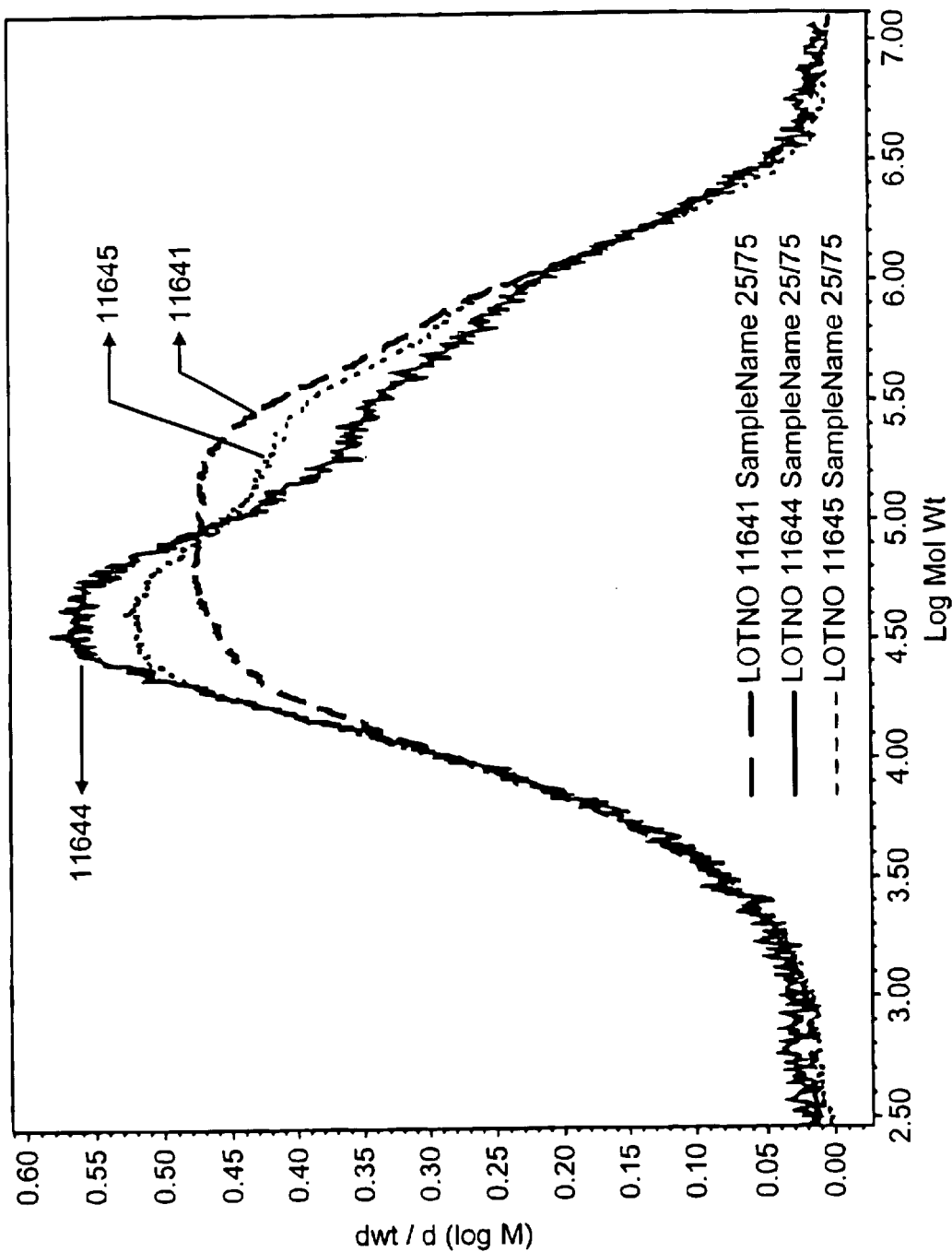
FIG. 3 is a graph of GPC curves for three runs of Example 2.

References are to FIG. 2.

The following description exemplifies one way of achieving control over the fractions of the polymer components by employing two feeders.

In this example, it is assumed that two different dual site catalysts 1 and 2 are used, both having two active sites, A and B. It is then obvious that knowing the amount of one of the fractions, the amount of the other fraction is also known. Hence, it is possible to focus on the polymer fraction made by either site, for example, site A.

With regard to FIG. 2:

Symbols: (^means calculated)

q^model calculated values for certain variables.

$u_1$ general catalyst flow setpoint for feeder 1 to polymerization reactor $u_2$ general catalyst flow setpoint for feeder 2 to polymerization reactor p^Adjustable parameters in equations like kinetic rate constants etc.

q(za) Measured fraction of polymer component A (from online rheometer data)

q^(ZA) Calculated fraction of polymer component A process model u Manipulated variables, i.e. variables manipulated to control the process u^(1) Catalyst flow setpoint for feeder 1 to polymerisation reactor u^(2) Catalyst flow setpoint for feeder 2 to polymerisation reactor v Measured process variables (disturbances/not manipulated)

x^Calculated process conditions yset(za) Setpoint for fraction of polymer component A given by plant operator y^(za) Modelled value of the controlled variable, i.e. the polymer components' fractions.

Each box in FIG. 2 will now be discussed:- +

Process

The process box designates the polymerisation reactor with feeding arrangements as described in the application and for example a means of measuring a process parameter, for example an on-line rheology measuring device. Such a device may be placed downstream from the polymer reactor to analyse the polymer melt). This rheology instrument may be used to provide measure estimates of MFR21 and MFR2. Dividing these, the FRR21/2 is obtained, and from the known relationship between FRR21/2 and polymer component A fraction (See Example 1), the measured polymer component A fraction is obtained (q). This measurement does not represent the polymer present at that instant in the reaction vessel, but rather the polymer produced a few moments earlier in the reactor.

Estimator

The estimator provides a mathematical adjustment of the calculated polymer composition employing actual measured polymer parameters. Physical models may have lower accuracy than needed for control purposes due to, for example, disturbances in the process not included in the model. When using adjustable constants in the process model, especially the polymerisation rate constants for each type of sites A and B, new values for these parameters are calculated using the deviation between calculated and measured process values. This allows the accuracy to be improved to the required level. From the deviation between measured fraction of component A and the modelled fraction of polymer A (at the relevant time) as well as the total polymerisation rate, two estimates of polymerisation rate kinetic constants may be calculated, one for production of polymer on type A site and one for type B site.

Model

The model is a 1st principles model used to predict what happens during a polymerisation process, especially in the polymerisation reactor employing calculations concerning mass and heat balances and kinetic chemical reaction rate expressions. These calcualtions may be used to predict the amounts and characteristics of polymer components made using mathematical methods only. From the estimated values of kinetic polymerisation rate constants, the predicted amounts and fractions of the production of polymer component A and B may be calculated.

Controller

Using the setpoint (target value) for the controlled variable (i.e. the fraction of polymer component A) and using the model to predict the effect of varying feeds of catalyst 1 and 2 on the controlled variable, the controller calculates the relative feeds of catalysts, u^(1) and u^(2), which will give a polymer in which the fraction of polymer component A is close or equal to the setpoint. From its input of calculated value of the production rate of polymer component A and the set point (target value) of the fraction of polymer component A, supplemented by its input of calculated total production rate vs target (setpoint) total production rate, the feed controller will calculate the relative feed of catalyst 1 and 2.

EXAMPLE 4

Flow Improvement

We have carried out flow evaluation with 50/50 dry mixtures of $CrO/SiO_2$ and $CrCp2/SiO_2$ catalysts. While the two individual catalysts have excellent flow, the mixture of the two becomes lumpy. We tried out a number of additives and evaluated the powder flow visually in a Thomas bottle.

The mixing experiments were carried out in the following manner: 0.5 g $CrO/SiO_2$ (calcined in air at 800° C. for 16 hrs, then reduced in CO/nitrogen (15% CO) for 3.5 hrs) was mixed with the desired amount of ZnO or other flow agent (All flow agents were dried overnight at 160° C., (ZnO Aktiv (Trade Name Zinkoxide aktiv from Bayer) has a specific surface area (BET) 45 m²/g, average particle size 3 microns; ZnO (Trade Name Larvik Zink Oxide fromLarvil Pigment, Norway) has a average particle size of 0.2 microns; Al powder has an average particle size of 20 microns; Fe powder has an average particle size of 10+microns; Cab-O-Sil has an average particle size of 0.03 microns), then 0.5 g $CrCp_2/SiO_2$ was added and the dry mixture was thoroughly shaken. By tilting the bottle and visually observing the ease of flow, the flow property was evaluated on a scale from 0 to 10 where 10 was given for excellent flow and 0 was given if no flow was observed when tilting the bottle 180°. The experimental results are given in the Table below. (CrO/Cab-O-Sil was calcinced in air at 800° C. overnight then reduced in CO/nitrogen at 380° C. for 3.5 hrs).

Table: Evaluation of flow when using ZnO etc as flow improver. Exp. 1 is a comparative example without any flow improver.

| Ex | Composition | wt % add. | Flow |
|---|---|---|---|
| 1 | 0.5 g $CrO/SiO_2$ + 0.5 g $CrCp_2/SiO_2$ | 0 | 2 |
| 2 | 0.5 g $CrO/SiO_2$ + 0.25 g ZnO (Bayer) + 0.5 g $CrCp_2/SiO_2$ | 25 | 10 |
| 3 | 0.5 g $CrO/SiO_2$ + 0.10 g ZnO (Bayer) + 0.5 g $CrCp_2/SiO_2$ | 10 | 10 |
| 4 | 0.5 g $CrO/SiO_2$ + 0.03 g ZnO (Bayer) + 0.5 g $CrCp_2/SiO_2$ | 3 | 10 |
| 5 | 0.5 g $CrO/SiO_2$ + 0.01 g ZnO (Bayer) + 0.5 g $CrCp_2/SiO_2$ | 1 | 7 |
| 6 | 0.5 g $CrO/SiO_2$ + 0.03 g ZnO (Larvik) + 0.5 g $CrCp_2/SiO_2$ | 3 | 2 |
| 7 | 0.5 g $CrO/SiO_2$ + 0.10 g ZnO (Larvik) + 0.5 g $CrCp_2/SiO_2$ | 10 | 9 |
| 8 | 0.5 g $CrO/SiO_2$ + 0.5 g $CrCp_2/SiO_2$ + 1.0 g Fe powder | 100 | 9 |
| 9 | 0.5 g $CrO/SiO_2$ + 0.5 g $CrCp_2/SiO_2$ + 1.0 g Zn powder | 100 | 7 |
| 10 | 0.5 g $CrO/SiO_2$ + 0.5 g $CrCp_2/SiO_2$ + 1.0 g Zn spheres (1 mm) | 100 | 1 |
| 11 | 0.25 g $CrO/SiO_2$ + 0.25 g $CrCp_2/SiO_2$ + 0.25 g Al dust | 50 | 7 |
| 12 | 0.5 g $CrO/SiO_2$ + 0.5 g $CrCp_2/SiO_2$ + 1.4 g fine PE powder | 140 | 4 |
| 13 | 0.5 g $CrO/SiO_2$ + 0.5 g $CrCp_2/SiO_2$ + 2.1 g fine PE powder treated with antistat 100 | 210 | 5 |
| 14 | 0.25 g $CrO/SiO_2$ + 0.25 g Cab-O-Sil treated with antistat + 0.25 g $CrCp_2/SiO_2$ | 50 | 1 |
| 15 | 0.25 g $CrO/SiO_2$ + 0.01 g (CrO/Cab-O-Sil) + 0.25 g $CrCp_2/SiO_2$ | 2 | 1 |
| 16 | 0.20 g $CrO/SiO_2$ + 0.05 g CrO/Cab-O-Sil + 0.25 g $CrCp_2/SiO_2$ | 11 | 1 |
| 17 | 0.25 g $CrO/SiO_2$ + 0.75 g $BN_3$ + 0.25 g $CrCp_2/SiO_2$ | 150 | 2 |
| 18 | 0.25 g $CrO/SiO_2$ + 1.0 g NaCl + 0.25 g $CrCp_2/SiO_2$ | 200 | 0 |

EXAMPLE 5

In order to check whether the flow improver had any influence on the polymerisation properties of the catalyst, ethylene polymerisations were carried out. Ethylene polymerisations were performed in a 1.01 autoclave using 0.51 isobutane as diluent, at 94° C. at a total pressure of 38 bar. The results from the polymerisations are given in the Table below. The activity of the catalyst is not significantly affected by the ZnO present.

Table: Results from ethylene polymerisations where flow improver was added to the catalyst. In the examples with ZnO the two catalyst components were mixed before being introduced to the reactor, while for the comparative examples without ZnO, the two catalyst components were introduced to the reactor separately. A wt/wt ratio between $CrO/SiO_2$ and $CrCp_2/SiO_2$ catalyst of 1.0 was used.

| wt % ZnO | $m_{cat}$ (mg) | p ($H_2$) bar | Act g/g/hr | MI g/10 min | HLMI g/10 min |
|---|---|---|---|---|---|
| 0 | 87 | 0.6 | 3500 | 0.15 | 17 |
| 0 | 78 | 0.6 | 3400 | 0.58 | 39 |
| 3 | 105 | 0.6 | 3000 | 0.05 | 9.4 |
| 10 | 95 | 0.6 | 3400 | 0.62 | 43 |

EXAMPLE 6

Flow Improvement in Slurry 0.25 g $CrO/SiO_2$ and 0.25 g CrCp2/SiO2 was mixed with 0.025 g ZnO in a Thomas bottle. After mixing the powders together the flow was excellent (flow=10). Addition of 1.0 ml pentane to the dry Powder gave a wet mud with poor flow properties (flow=2). Addition of another 1.0 ml pentane portion yields a flowing slurry with good flow properties (flow=8). Additional pentane additions (up to a total volume of 4.0 ml pentane) yielded slurries with excellent flow properties (flow=10).

COMPARATIVE EXAMPLE 7

0.25 g $CrO/SiO_2$ and 0.25 g $CrCp_2/SiO_2$ was mixed in a Thomas bottle. After mixing the powders together the powder becomes lumpy (flow=2). Addition of 1.0 ml pentane to the dry powder gave a wet mud with very poor flow properties (flow=0). Addition of another 1.0 ml pentane portion still yields a wet mud with very poor flow properties (flow=0). Additional pentane additions (up to a total volume of 4.0 ml pentane) did not yield a catalyst slurry; the powder was lumpy and stuck to the glass walls of the Thomas bottle (flow=0).

These examples show that ZnO is an efficient flow improver also when used in catalyst mixture slurries. The comparative example shows that major problems may occur when trying to introduce this specific catalyst mixture into a reactor as a slurry.

What is claimed is:

1. A process for olefin polymerization in a reaction vessel, said process comprising polymerizing at least one α-olefin in a polymerization stage employing a catalyst feed comprising
   1) a first catalyst composition having at least two different active catalytic components which produce a first set of polymer components;
   2) a second catalyst composition having at least two different active catalytic components which produce essentially the same set of polymer components as produced by the catalyst in feed (1) under the same polymerization conditions but these components in a different ratio to those produced by the catalyst composition of feed (1);
      wherein the amounts of catalyst compositions (1) and (2) fed into the reaction vessel are independently controlled.
2. A process as claimed in claim 1 wherein said first and second catalyst compositions comprise a combination of Ziegler Natta components, metallocene components and chromium oxide components.
3. A process as claimed in claim 1 or 2 wherein said first and second catalyst compositions comprise the same type of catalyst components.
4. A process as claimed in claim 1 wherein said first and second catalyst compositions are catalyst mixes.
5. A process as claimed in claim 4 wherein said catalyst mixes comprise a flow agent.

6. A process as claimed in claim 5 wherein said flow agent is ZnO.

7. A process as claimed in claim 5 or 6 wherein said catalyst mixes are fed with a liquid as a slurry.

8. A process as claimed in claim 1 wherein said first and second catalyst compositions are fed by separate catalyst feeders.

9. A process as claimed in claim 1 wherein the process is continuous.

10. A process as claimed in claim 1 wherein the amounts of catalyst compositions (1) and (2) added to said reaction vessel are controlled by a control system using rheology and/or spectroscopic and/or NMR characterization as feedback for polymer properties.

11. A process as claimed in claim 1 wherein there are no further polymerization reaction stages.

12. A process as claimed in claim 1 wherein additional polymerization stages are employed after the polymerization stage of claim 1.

13. A process as claimed in claim 1 wherein the first and second catalyst compositions are fed via a prepolymerization stage.

14. A process as claimed in claim 1 wherein said polymerization stage is performed in a slurry reactor or a gas phase reactor.

15. A process as claimed in claim 1 wherein the first catalyst composition has passed one or several polymerization stages prior to the polymerization stage of claim 1 and wherein the second catalyst composition is fed into the polymerization stage of claim 1 without having passed through an earlier polymerization stage.

16. A process as claimed in claim 1 wherein said catalyst comprises two types of n-ligand catalytic sites or has n-ligand catalytic sites and chromium oxide sites.

17. A process as claimed in claim 16 wherein the catalyst comprises a bridged bis(indenyl) skeleton and a group (IV) transition metal catalyst.

18. A process as claimed in claim 17 wherein the catalyst comprises a combination of an unbridged (alkyl substituted) metallocene with a substituted silicon bridged bis(indenyl) zirconium dichloride catalyst.

* * * * *